3,067,175
POLYGLYCIDALDEHYDE

William J. Sullivan, Oakland, and Paul H. Williams, Orinda, Calif., assignors to Shell Oil Company, New York, N.Y., a corporation of Delaware
No Drawing. Filed Mar. 7, 1960, Ser. No. 12,903
8 Claims. (Cl. 260—67)

This invention relates to polymers of glycidaldehyde and alkyl substituted glycidaldehydes which are characterized by polymerization through the epoxy group. The present invention also relates to a method of preparing such polymers.

The polymers which are resistant to organic solvents and heat stable have many known uses by virtue of the fact that they can be shaped into many different articles of manufacture by molding or casting or other known methods. Materials which are solvent resistant and heat stable have certain obvious advantages and therefore it is desirable to find commercially attractive methods for preparing such materials. It is also desirable to obtain resins which contain functional groups whereby further curing is possible after the material has been shaped in order to provide exceptionally good physical properties. It is an objective of the present invention to provide a novel resin material having the above mentioned properties. It has now been found, that glycidaldehyde may be polymerized to stable resins by polymerizing the monomer through the epoxy group. The resulting polymer is characterized by having substantially no epoxy groups and for the sake of definition, it will have less than, say, 0.1 epoxy equivalent per 100 grams and preferably less than 0.01 epoxy equivalent per 100 grams.

After polymerization takes place through the epoxy group, it is possible for simultaneous reactions to take place with the aldehyde group and thereby provide a resulting resin of high molecular weight having little functionality. It is also possible to provide polymerization reactions where the aldehyde groups are retained at least to the extent of more than 0.1 equivalent per 100 grams, and usually to the extent of more than 0.25 equivalent per 100 grams. These latter reactions are preferred because a resin is provided which contains a functional group that may be further cured after the solid resin has been shaped.

In general, the monomer which may be polymerized in accordance with this invention has the formula

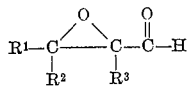

where $R^1$, $R^2$ and $R^3$ are selected from the class consisting of hydrogen and alkyl groups having from 1 to 8 carbon atoms. Preferably $R^1$, $R^2$ and $R^3$ are hydrogen and thus the preferred compound is glycidaldehyde. Next preferred are the compounds in which two of the groups $R^1$, $R^2$ and $R^3$ are hydrogen and the other group is an alkyl group, preferably methyl or ethyl. Specific examples of monomers capable of polymerizing in accordance with this invention include glycidaldehyde, 2,3-epoxy butyraldehyde, alpha methyl glycidaldehyde, 2,3-epoxy-2-methyl-butyraldehyde, alpha,beta, epoxy pentenal, and alpha,beta epoxy henanal.

The monomers of the present invention may be readily prepared by the epoxidation of alpha,beta unsaturated aldehyde such as acrolein, crotonaldehyde, methyl crotonaldehyde, tiglic aldehyde and cinnamylaldehyde. These monomers may be obtained by known or special methods of epoxidizing unsaturated aldehydes such as the method disclosed in the copending application. Serial No. 738,943 now U.S. Patent 2,947,761 of George B. Payne, filed June 2, 1958.

The polymerization utilized in the present invention is a cationic type polymerization utilizing metal halides which may be characterized as "Lewis acid catalyst." Broadly speaking these Lewis acid catalysts are halides of metals taken from Groups IIB, IIIB, IVB, VA, VIA, and transition elements of the Mendelejeff Periodic Table. The activity of the particular catalyst varies considerably and when the more inactive catalysts are used, it may be necessary to heat the reaction mixture and allow a longer period of time for the polymerization reaction to take place than with more active catalysts. With extremely active catalysts, it may be desirable to control the polymerization by lowering the temperature at least during the first part of the polymerization reaction. Examples of materials which are suitable for the present polymerization reaction include aluminum chloride, stannic chloride, beryllium dichloride, ferrous bromide, ferric chloride, stannic chloride, titanium tetrachloride, zinc chloride, zirconium tetrachloride, indium trichloride, mercuric chloride, and boron trifluoride.

The reaction is conducted by bringing the monomer and catalyst together in a reactor and, as indicated above, the reaction usually proceeds smoothly at normal temperatures. The amount of catalyst used is generally kept down to as small an amount as is necessary to provide the desired degree of polymerization and will usually be within the range of, say, 0.01 to 5.0 parts per 100 parts of monomer. Larger amounts of catalyst will be operable but have the disadvantage of promoting side reactions and using excessive amounts of catalysts which would have to be removed. Although it is not essential, a solvent which is inert to the reactants may be used to provide further control. Inert hydrocarbons such as benzene, xylene, heptanes, and octanes are suitable. It is also considered desirable to conduct the reaction in an inert atmosphere. Anhydrous reaction conditions should also be observed and preferably the reactor and all of the reaction ingredients are dried by conventional methods before use.

After the reaction is complete, the product resin may be used without further purification since the amount of catalyst is small and need not be removed. In fact, in some situations where the product is to be cast, it is possible to allow the reaction to take place in the molded form to produce exceptionally stable, solvent resistant and hard polymers. The polymer may also be precipitated in aqueous solution particularly where the polymer is soluble in organic solvents which may be either used during the polymerization or added afterwards. In such a case the catalyst will generally remain in solution in the water. If the catalyst is insoluble in water, materials capable of solubilizing the catalyst salts such as mineral acid may be added depending on the nature of the polymer. It is not known exactly what the polymerization mechanism is and it appears to vary somewhat with different catalyst systems. However, it is believed that the principal polymerization reactions are a combination of the reactions listed below as Type I and Type II.

Type I

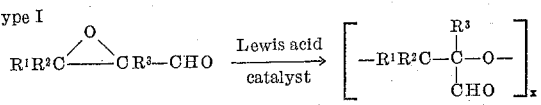

Type II

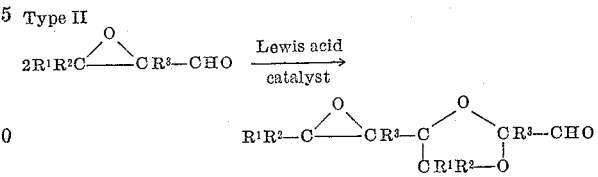

The initial polymerizations of the above nature are perhaps unstable and further formations take place because polymers are formed which contain a relatively small number of carbonyl groups and yet which appear to be substantially free from acetals. These later resins are believed to be high molecular weight because they are insoluble in water, acids and organic solvents. It is also possible to obtain lower molecular weight polymers having carbonyl contents above 0.1 equivalents per 100 grams which can be easily shaped or sheeted and cured. It is further possible to obtain low molecular weight materials which are liquids and are suitable for fiber treatment such as paper and textiles.

While the present invention is particularly directed to homopolymers of the alpha,beta epoxy aldehydes described above, it is also within the ambient of this invention to include small amounts of other epoxides and thus make a copolymer.

The present invention is more fully illustrated by the following examples:

*Example I*

21.6 grams of glycidaldehyde and 0.2 gram of stannic chloride were added to a 250 ml. Erlenmeyer flask which had been flushed with dry nitrogen at a temperature of −70° C. The mixture was warmed by placing the reaction flask in an ice water bath. After several hours, the temperature rose to room temperature and the material in the reaction flask became a solid amber colored resin. A portion was found to be extremely water insoluble and insoluble in all common organic solvents. The substance was further resistant to reflux with 30% sulfuric acid. Another portion was further cured in an oven at 60° C. for 4 hours. This portion had a Barcol hardness of 90.

*Example II*

23.7 grams of a portion of freshly distilled glycidaldehyde which had been dried over Drierite for 48 hours was added to a solution of 0.5 gram stannic chloride and 82 grams of dry benzene in a 250 ml. Erlenmeyer flask which had been flushed with dry nitrogen. The reaction was slightly exothermic and the temperature reached 35° C. was cooled to room temperature, and allowed to stand for 3 weeks. A white solid precipitate was filtered out, and vacuum dried. 3.4 grams of water white powder was thus obtained which was insoluble in organic solvents and insoluble in water. The filtrate was flashed at 2 ml. and a temperature of 50–55° C. to give 17.8 grams of oily liquid soluble in benzene and acetone. This latter material also had a determined molecular weight of 1000 but due to the method used, hydrolysis of the material undoubtedly had occurred. A total carbonyl content of 0.68 and a free carbonyl of 0.61 equivalent per 100 grams was found. A portion of the solution was recrystallized by addition to a liter of methanol. The recrystallized solution had a softening point of 94–104° C. but did not melt.

This example illustrates that resins having a comparatively high carbonyl content, that is one above 0.5 equivalent per 100 grams, is obtainable by the procedure of the present invention.

*Example III*

14.4 grams of anhydrous glycidaldehyde was dissolved in 100 ml. of anhydrous toluene. Another solution containing 2 ml. of boron trifluoride etherate (a constant boiling mixture containing about 1 part of boron trifluoride and 1 part of ether) in 400 ml. anhydrous toluene was prepared. The two solutions were then brought together in a reactor which had been flushed with dry nitrogen, and the mixture was cooled with an ice water bath and allowed to stir overnight. At this point there was no visible sign of reaction and the mixture was heated to 60° C. for 6 hours, cooled and mixed with a solution of 5 grams sodium carbonate in 150 ml. of water. The precipitate which formed was filtered with a Buchner funnel, washed with water, methanol and then ether, and dried under a vacuum. 8.9 grams of material was obtained which had an epoxy equivalence of 0.00, an acidity of 0.01, a hydroxy value of 0.483, and a free carbonyl content of 0.290 per hundred grams.

A portion of this material was pressed at 120° C. at 10,000 p.s.i.g. into a clear but slightly yellow colored disk. The material did not melt, and carbonized above 300° C.

*Example IV*

14.2 grams of glycidaldehyde and 4 grams of zinc chloride were mixed in a reactor under anhydrous conditions and heated at 60° C. for 2 weeks. The polymer thus obtained was washed with water to provide a white amorphous material having an analysis of carbon 43.2%, hydrogen 6.0%, total carbonyl 0.257 equivalent per hundred grams, and water 4.94%.

*Example V*

The procedure of Example IV was repeated except that ferric chloride was used in place of zinc chloride. The material polymerized to form a dark brown polymer.

*Example VI*

The procedure of Example IV was repeated except that the zinc chloride is replaced with the following catalysts in the number of different runs, vis. aluminum chloride, stibnic pentachloride, beryllium dichloride, boron trichloride, ferrous bromide, mercuric chloride and titanium tetrachloride. In all cases polymers are formed.

We claim as our invention:

1. A homopolymer of a compound having the formula

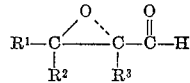

where $R^1$, $R^2$ and $R^3$ are selected from the class consisting of hydrogen and alkyl groups having from 1 to 8 carbon atoms, said polymer containing less than 0.1 epoxy equivalent per 100 grams of polymer and having a carbonyl content greater than 0.1 equivalent per 100 grams of polymer.

2. The polymer defined in claim 1, in which the carbonyl content is greater than 0.25 equivalent per 100 grams of polymer.

3. The polymer defined in claim 1, in which the epoxy groups have been completely reacted.

4. The polymer defined in claim 3, in which one of the groups $R^1$, $R^2$ and $R^3$ is an alkyl group and the other two groups are hydrogen.

5. A homopolymer of glycidaldehyde having a molecular weight above about 300 and having the epoxy group of the monomer reacted to such an extent that substantially no epoxy groups are present in the polymer and having a carbonyl content greater than 0.1 equivalent per 100 grams of polymer.

6. The polymer defined in claim 5, in which the molecular weight is above 1000.

7. The polymer defined in claim 5, in which reactive carbonyl groups are present in an amount greater than 0.25 equivalent per 100 grams.

8. The polymer defined in claim 5, in which reactive carbonyl groups are present in an amount greater than 0.50 equivalent per 100 grams.

References Cited in the file of this patent

UNITED STATES PATENTS

| | | |
|---|---|---|
| 2,887,498 | Hearne et al. | May 19, 1959 |
| 2,917,470 | Bressler et al. | Dec. 15, 1959 |